United States Patent
Pusdesris et al.

(10) Patent No.: US 12,405,799 B2
(45) Date of Patent: Sep. 2, 2025

(54) REGISTER RENAME STAGE FUSING OF INSTRUCTIONS

(71) Applicant: Arm Limited, Cambridge (GB)

(72) Inventors: Joseph Michael Pusdesris, Austin, TX (US); Yasuo Ishii, Austin, TX (US); Eric Charles Quinnell, Austin, TX (US); Nicholas Andrew Plante, Austin, TX (US)

(73) Assignee: Arm Limited, Cambridge (GB)

( * ) Notice: Subject to any disclaimer, the term of this patent is extended or adjusted under 35 U.S.C. 154(b) by 289 days.

(21) Appl. No.: 16/952,661

(22) Filed: Nov. 19, 2020

(65) Prior Publication Data
US 2022/0156078 A1    May 19, 2022

(51) Int. Cl.
*G06F 9/38*    (2018.01)
*G06F 9/30*    (2018.01)

(52) U.S. Cl.
CPC .......... *G06F 9/384* (2013.01); *G06F 9/30181* (2013.01); *G06F 9/3838* (2013.01)

(58) Field of Classification Search
CPC .... G06F 9/384; G06F 9/30181; G06F 9/3838; G06F 9/30185; G06F 9/00–3897; G06F 15/00–825
See application file for complete search history.

(56) References Cited

U.S. PATENT DOCUMENTS

| | | | | |
|---|---|---|---|---|
| 4,439,828 | A * | 3/1984 | Martin | G06F 9/30181 712/226 |
| 5,051,940 | A * | 9/1991 | Vassiliadis | G06F 9/3001 708/524 |
| 8,788,795 | B2 * | 7/2014 | Arimilli | G06F 9/3806 712/220 |
| 8,843,729 | B2 * | 9/2014 | Parks | G06F 9/3861 712/208 |
| 9,798,527 | B1 * | 10/2017 | Bendersky | G06F 8/433 |
| 2002/0087955 | A1 * | 7/2002 | Ronen | G06F 9/3001 717/151 |
| 2003/0074654 | A1 * | 4/2003 | Goodwin | G06F 8/443 717/161 |
| 2004/0128483 | A1 * | 7/2004 | Grochowski | G06F 9/30181 712/217 |

(Continued)

*Primary Examiner* — Keith E Vicary
(74) *Attorney, Agent, or Firm* — NIXON & VANDERHYE P.C.

(57) ABSTRACT

In register renaming circuitry architectural registers specified in instructions are mapped to physical registers using a mapping table. Operations to be performed with respect to the physical registers are generated in dependence on the instructions and on the mapping table entries. When the mapping table has a mapping of a first instruction destination physical register for a first instruction destination architectural register specified in a first instruction, a second instruction specifying the first instruction destination architectural register as a second instruction source architectural register causes an adapted second operation to be generated corresponding to the second instruction using at least one first instruction source physical register as at least one second instruction source physical register. The adapted second operation incorporates a first operation corresponding to the first instruction.

10 Claims, 11 Drawing Sheets

(56) References Cited

U.S. PATENT DOCUMENTS

| | | | |
|---|---|---|---|
| 2007/0038844 A1* | 2/2007 | Valentine | G06F 9/3863 |
| | | | 712/219 |
| 2009/0031120 A1* | 1/2009 | Vaden | G06F 9/3001 |
| | | | 712/226 |
| 2010/0115248 A1* | 5/2010 | Ouziel | G06F 13/4063 |
| | | | 712/226 |
| 2014/0047221 A1* | 2/2014 | Irwin | G06F 9/30072 |
| | | | 712/226 |
| 2016/0179542 A1* | 6/2016 | Lai | G06F 9/3001 |
| | | | 712/208 |
| 2017/0123808 A1* | 5/2017 | Caulfield | G06F 9/3836 |
| 2018/0129501 A1* | 5/2018 | Levison | G06F 9/30181 |
| 2019/0179639 A1* | 6/2019 | Boersma | G06F 9/3016 |
| 2019/0179640 A1* | 6/2019 | Silberman | G06F 9/30181 |

\* cited by examiner

| ADD | x3 | x1 | x2 |
|---|---|---|---|
| ADD | x5 | x3 | x4 |

FIG. 3A

| ARCH. REG | PHYS. REG | PHYS. REG | OPERATION |
|---|---|---|---|
| x1 | R8 | | |
| x2 | R9 | | |
| x3 | R10 | | |
| x3 | R8 | R9 | ADD |
| x4 | R7 | | |
| x5 | R11 | | |

FIG. 3B

| ADD | R10 | R8 | R9 | |
|---|---|---|---|---|
| ADD | R11 | R8 | R9 | R7 |

FIG. 3C

| ADD | x3 | x1 | x2 |
|---|---|---|---|
| ADD | x5 | x3 | x4 |
| ADD | x7 | x5 | x6 |

FIG. 4A

| ARCH. REG | PHYS. REG | PHYS. REG | PHYS. REG | OPERATION |
|---|---|---|---|---|
| x1 | R8 | | | |
| x2 | R9 | | | |
| x3 | R10 | | | |
| x3 | R8 | R9 | | ADD |
| x4 | R7 | | | |
| x5 | R11 | | | |
| x5 | R8 | R9 | R7 | ADD |
| x6 | R12 | | | |
| x7 | R13 | | | |

FIG. 4B

| ADD | R10 | R8 | R9 | | |
|---|---|---|---|---|---|
| ADD | R11 | R8 | R9 | R7 | |
| ADD | R13 | R8 | R9 | R7 | R12 |

FIG. 4C

| ADD | x3 | x1 | x2 |
|-----|----|----|----|
| LDR | x4 | x3 | #1 |

FIG. 5A

| ADD | R10 | R8 | R9 |    |
|-----|-----|----|----|----|
| LDR | R7  | R8 | R9 | #1 |

FIG. 5B

| RR Cycle 0 | mnemonic | uid | dst0 (ptag) | dst1 (ptag) | src0 (ptag) | imm |
|---|---|---|---|---|---|---|
| Lane0 | LDP | 0x10 | x0 | x1 | x8 (0x0) | |
| Lane1 | ADD | 0x11 | x8 (0x1) | | x8 (0x0) | #16 |
| Lane2 | LDP | 0x12 | x2 | x3 | x8 (0x1) | |
| Lane3 | ADD | 0x13 | x8 (0x2) | | x8 (0x1) | #16 |

| RR Cycle 1 | mnemonic | uid | dst0 (ptag) | dst1 (ptag) | src0 (ptag) | imm |
|---|---|---|---|---|---|---|
| Lane0 | LDP | 0x14 | x4 | x5 | x8 (0x2) | |
| Lane1 | ADD | 0x15 | x8 (0x3) | | x8 (0x3) | #16 |
| Lane2 | LDP | 0x16 | x6 | x7 | x8 (0x3) | |
| Lane3 | ADD | 0x17 | x8 (0x4) | | x8 (0x3) | #16 |

| SX0 | Cycle 0 | Cycle 1 | Cycle 2 | Cycle 3 |
|---|---|---|---|---|
| i0 | | 0x11 | 0x13 | 0x15 |
| i1 | | | 0x11 | 0x13 |
| i2 | | | | 0x11 |

| SX1 | Cycle 0 | Cycle 1 | Cycle 2 | Cycle 3 |
|---|---|---|---|---|
| i0 | | | | |
| i1 | | | | |
| i2 | | | | |

| LS0 | Cycle 0 | Cycle 1 | Cycle 2 | Cycle 3 |
|---|---|---|---|---|
| i0 | | 0x10 | 0x12 | 0x14 |
| i1 | | | 0x10 | 0x12 |
| i2 | | | | 0x10 |

| LS1 | Cycle 0 | Cycle 1 | Cycle 2 | Cycle 3 |
|---|---|---|---|---|
| i0 | | | | |
| i1 | | | | |
| i2 | | | | |

FIG. 6

| RR Cycle 0 | mnemonic | uid | dst0 (ptag) | dst1 (ptag) | src0 (ptag) | imm | imm2 |
|---|---|---|---|---|---|---|---|
| Lane0 | LDP | 0x10 | x0 | x1 | x8 (0x0) | | |
| Lane1 | ADD | 0x11 | x8 (0x1) | | x8 (0x0) | #16 | |
| Lane2 | LDP | 0x12 | x2 | x3 | x8 (0x1) | | |
| Lane3 | ADD | 0x13 | x8 (0x2) | | x8 (0x0) | #16 | #16 |

| RR Cycle 1 | mnemonic | uid | dst0 (ptag) | dst1 (ptag) | src0 (ptag) | imm | imm2 |
|---|---|---|---|---|---|---|---|
| Lane0 | LDP | 0x14 | x4 | x5 | x8 (0x2) | | |
| Lane1 | ADD | 0x15 | x8 (0x3) | | x8 (0x2) | #16 | |
| Lane2 | LDP | 0x16 | x6 | x7 | x8 (0x3) | | |
| Lane3 | ADD | 0x17 | x8 (0x4) | | x8 (0x2) | #16 | #16 |

| SX0 | Cycle 0 | Cycle 1 | Cycle 2 | Cycle 3 |
|---|---|---|---|---|
| i0 | | 0x11 | 0x15 | 0x19 |
| i1 | | | 0x11 | 0x15 |
| i2 | | | | 0x11 |

| SX1 | Cycle 0 | Cycle 1 | Cycle 2 | Cycle 3 |
|---|---|---|---|---|
| i0 | | 0x13 | 0x17 | 0x18 |
| i1 | | | 0x13 | 0x17 |
| i2 | | | | 0x13 |

| LS0 | Cycle 0 | Cycle 1 | Cycle 2 | Cycle 3 |
|---|---|---|---|---|
| i0 | | 0x10 | 0x12 | 0x16 |
| i1 | | | 0x10 | 0x12 |
| i2 | | | | 0x10 |

| LS1 | Cycle 0 | Cycle 1 | Cycle 2 | Cycle 3 |
|---|---|---|---|---|
| i0 | | | 0x14 | 0x18 |
| i1 | | | | 0x14 |
| i2 | | | | |

FIG. 7

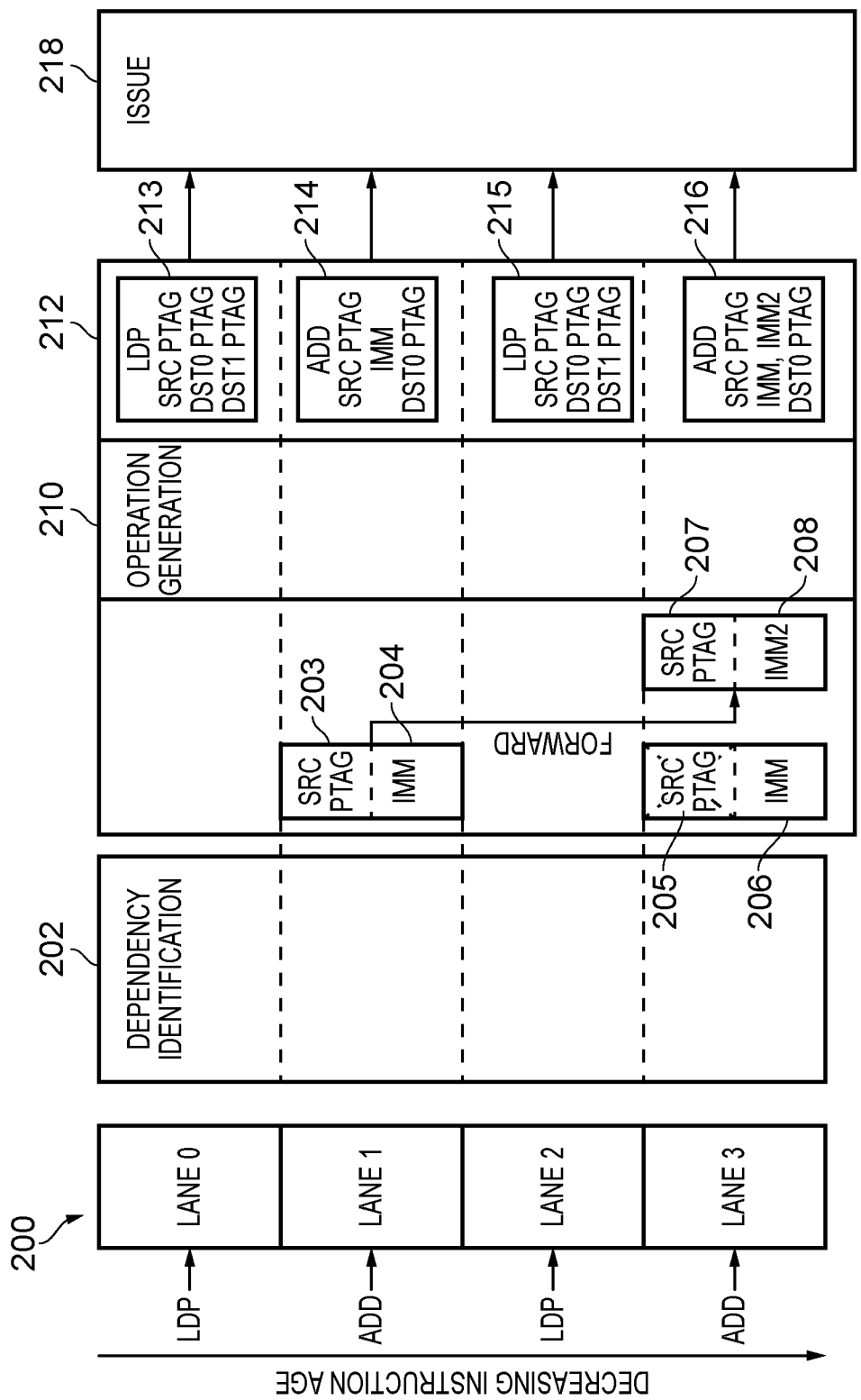

REGISTER RENAME STAGE FUSING OF INSTRUCTIONS

TECHNICAL FIELD

The present disclosure relates to data processing. In particular, the present disclosure relates to the handling of data processing instructions at a renaming stage.

DESCRIPTION

A data processing apparatus which is arranged to perform data processing operations in response to a sequence of instructions is typically required to respect the ordering of those instructions. Furthermore this is of particular significance when more than one instruction refers to the same register within the data processing apparatus, because the ordering of the data processing operations with respect to the content of the register may be important in order to ensure that the correct data processing operations to be carried out. Otherwise such known data hazards as read-after-write, write-after-read, and write-after-write may occur. Nevertheless contemporary data processing apparatuses may also be arranged to perform out-of-order instruction execution in order to achieve a higher instruction throughput. In order to support this a data processing apparatus may be provided with register renaming circuitry, which is arranged to administer the mapping between architectural registers specified in the instructions and physical registers present in the data processing apparatus. Such register renaming, in particular in the case when a greater number of physical registers are provided than architectural registers which may be specified, allows a certain amount of out-of-order instruction execution to occur, but nevertheless the ordering between at least some instructions must still be respected in order to avoid the above-mentioned data hazards from occurring. This can mean that sequential (as opposed to parallel) instruction execution may be necessary in the presence of certain data dependencies, even when a data processing apparatus in principle has the capability for parallel instruction execution.

SUMMARY

In one example embodiment described herein there is an apparatus comprising:
processing circuitry to perform data processing operations in response to instructions;
physical registers to hold data values upon which the data processing operations are performed;
register renaming circuitry to perform register renaming to map architectural registers specified in the instructions to the physical registers in support of out-of-order execution of the instructions by the processing circuitry,
wherein performing the register renaming comprises creating entries in a mapping table, the entries indicative of mappings between the architectural registers specified in the instructions and the physical registers,
wherein the register renaming circuitry is arranged to specify operations to be performed by the processing circuitry with respect the physical registers in dependence on the instructions and on the entries in the mapping table,
wherein when for a first instruction an entry in the mapping table is indicative of a mapping to a first instruction destination physical register for a first instruction destination architectural register specified in the first instruction,
the register renaming circuitry is responsive to a second instruction which specifies the first instruction destination architectural register as a second instruction source architectural register to adapt a specification of a second operation to generate an adapted second operation to be performed by the processing circuitry corresponding to the second instruction to use at least one first instruction source physical register as at least one second instruction source physical register, and wherein the adapted second operation incorporates a first operation corresponding to the first instruction.

In one example embodiment described herein there is a method comprising:
performing data processing operations in processing circuitry in response to instructions;
holding data values in physical registers upon which the data processing operations are performed;
perform register renaming to map architectural registers specified in the instructions to the physical registers in support out-of-order execution of the instructions by the processing circuitry, wherein performing the register renaming comprises creating entries in a mapping table, the entries indicative of mappings between the architectural registers specified in the instructions and the physical registers;
specifying operations to be performed by the processing circuitry with respect the physical registers in dependence on the instructions and on the entries in the mapping table; and
when for a first instruction an entry in the mapping table is indicative of a mapping to a first instruction destination physical register for a first instruction destination architectural register specified in the first instruction,
adapting a specification of a second operation, in response to a second instruction which specifies the first instruction destination architectural register as a second instruction source architectural register, to generate an adapted second operation to be performed by the processing circuitry corresponding to the second instruction to use at least one first instruction source physical register as at least one second instruction source physical register, wherein the adapted second operation incorporates a first operation corresponding to the first instruction.

In one example embodiment described herein there is an apparatus comprising:
means for performing data processing operations in response to instructions;
means for holding data values in physical registers upon which the data processing operations are performed;
means for performing register renaming to map architectural registers specified in the instructions to the physical registers in support out-of-order execution of the instructions by the means for performing data processing operations, wherein performing the register renaming comprises creating entries in a mapping table, the entries indicative of mappings between the architectural registers specified in the instructions and the physical registers;
means for specifying operations to be performed by the means for performing data processing operations with respect the physical registers in dependence on the instructions and on the entries in the mapping table; and means for adapting a specification of a second operation, when for a first instruction an entry in the mapping table is indicative of a mapping to a first instruction destination physical register for a first instruction destination architectural register specified in a first instruction, the means for adapting the specification of a second operation responsive to a second instruction which specifies the first instruction destination architectural register as a second instruction source architectural register, to generate an adapted second operation to be performed by the means for performing data processing operations corresponding to the second instruction to use at least one first instruction source physical register as at least one second instruction source physical register, wherein the adapted second operation incorporates a first operation corresponding to the first instruction.

BRIEF DESCRIPTION OF THE DRAWINGS

The present invention will be described further, by way of example only, with reference to embodiments thereof as illustrated in the accompanying drawings, in which:

FIGS. 3A, 3B, and 3C illustrate the manner in which two instructions which are processed at a renaming stage may be handled in accordance with some embodiments;

FIGS. 4A, 4B, and 4C illustrate how a sequence of three instructions may be handled at a renaming stage in accordance with some example embodiments;

FIGS. 5A and 5B illustrate how a pair of instructions, of which one has an immediate value source operand, may be handled according to some example embodiments;

FIG. 6 shows how renaming and execution may be carried out and scheduled in prior art examples;

FIG. 7 shows how renaming and execution may be carried out and scheduled in accordance with some example embodiments;

FIG. 8 schematically illustrates an example rename stage circuitry in accordance with some example embodiments;

DESCRIPTION OF EXAMPLE EMBODIMENTS

Figure 1:
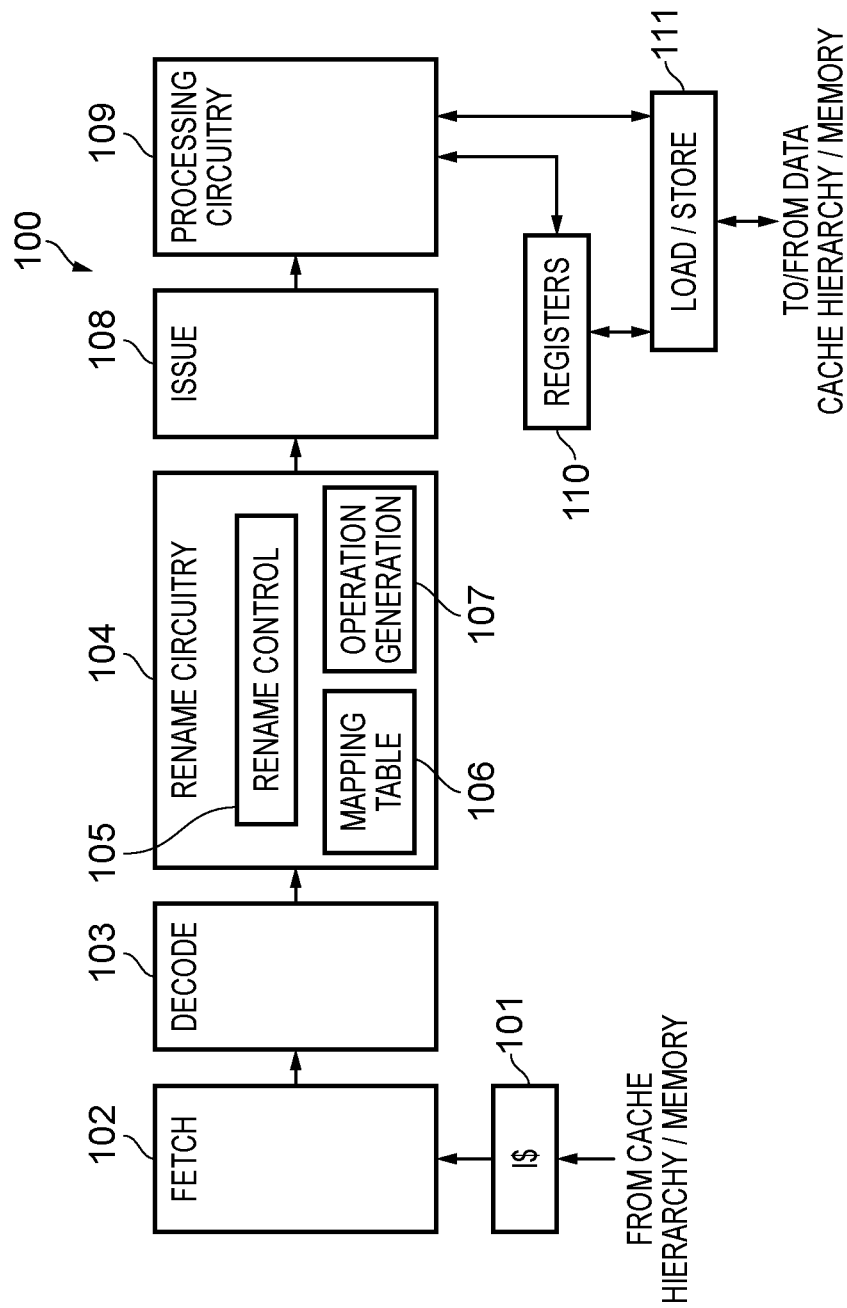
FIG. 1 schematically illustrates an apparatus according to some example embodiments.

Before discussing the embodiments with reference to the accompanying figures, the following description of embodiments is provided.

In accordance with one example configuration there is provided an apparatus comprising:

processing circuitry to perform data processing operations in response to instructions;

physical registers to hold data values upon which the data processing operations are performed;

register renaming circuitry to perform register renaming to map architectural registers specified in the instructions to the physical registers in support of out-of-order execution of the instructions by the processing circuitry, wherein performing the register renaming comprises creating entries in a mapping table, the entries indicative of mappings between the architectural registers specified in the instructions and the physical registers, wherein the register renaming circuitry is arranged to specify operations to be performed by the processing circuitry with respect the physical registers in dependence on the instructions and on the entries in the mapping table, wherein when for a first instruction an entry in the mapping table is indicative of a mapping to a first instruction destination physical register for a first instruction destination architectural register specified in the first instruction, the register renaming circuitry is responsive to a second instruction which specifies the first instruction destination architectural register as a second instruction source architectural register to adapt a specification of a second operation to generate an adapted second operation to be performed by the processing circuitry corresponding to the second instruction to use at least one first instruction source physical register as at least one second instruction source physical register, and wherein the adapted second operation incorporates a first operation corresponding to the first instruction.

The present techniques are based on an understanding of the data dependencies which may occur between instructions executed by the processing apparatus. For example, when a destination register specified in an earlier instruction is a source register specified in a later instruction, it is necessary for the first instruction to be executed and thus modify the content of that register, before execution of the later instruction, to avoid a data hazard arising, i.e. where the second instruction uses the content of that register before modification by the first instruction, thus resulting in an incorrect data state in the data processing apparatus. The present techniques have however recognised that an opportunity exists to improve the instruction throughput of such a data processing apparatus, in particular at the register renaming stage of the data processing apparatus, where the link between instructions can be identified i.e. the use of a source operand register by a later instruction of a destination register from an earlier instruction. In particular, the identification of this dependency link between instructions then enables the register renaming circuitry, for the second instruction, to combine the operation defined for the first instruction, along with its defined source operands, into a combined operation incorporating the data processing to be performed in response to both the first and the second instructions. It should therefore be understood that this technique makes use of the ability of such a data processing apparatus to perform such combined operations, however the present techniques realise that this may be the case, at least for certain types of instructions. Although the present techniques are not limited to such instructions, one example is that of an addition operation, initiated by an ADD instruction, where the data processing apparatus has the capability to perform either two or three operand addition. Accordingly, in such an example if two instructions specify two 2-operand additions, there may be the opportunity for these to be fused according to the present techniques at the register renaming stage into a 3-operand addition. The adaptation of the specification of the second operation to be carried out corresponding to the second instruction as described above means that a first operation corresponding to the first instruction and the second operation corresponding to the second instruction are then decoupled from one another, in the sense that there is no longer a dependency between the two. This then provides the opportunity for the scheduling of the respective first and second operations to be carried out more flexibly, and in particular that their ordering with respect to one another is no longer significant.

The identification of a second instruction with the appropriate dependency on the first instruction (i.e. which specifies the first instruction destination architectural register as a second instruction source architectural register) may take place in a range of ways, in particular with regard to the separation of the first and second instructions. That is to say, in some examples the first and second instructions may be very close (even adjacent) to one another in the sequence of instructions being executed, whereas in other examples the first and second instructions may be significantly separated from one another with many other instructions intervening in the sequence of instructions being executed. Thus in some examples (where the first and second instructions are relatively close to one another) the register renaming circuitry may identify the dependency between the first and the second instructions "on-the-fly", as these instructions pass through the register renaming stage of the instruction execution pipeline.

In some other examples (where the first and second instructions are more distant from one another) the register renaming circuitry may be provided with a mechanism to record the necessary information about the first instruction, such that the adaptation of the specification of the second operation to generate the adapted second operation to be performed by the processing circuitry corresponding to the second instruction can occur with less dependency on the separation between the first instruction and the second instruction. Accordingly, in some embodiments the register renaming circuitry is further responsive to the first instruction to create a supplementary entry in the mapping table, wherein the supplementary entry is indicative of a mapping of the first instruction destination architectural register to the at least one first instruction source physical register and is indicative of a type of the first instruction, wherein the at least one first instruction source physical register is mapped in the mapping table to at least one first instruction source architectural register specified in the first instruction, and wherein the register renaming circuitry is further responsive to the second instruction which specifies the first instruction destination architectural register as the second instruction source architectural register, when the supplementary entry is present in the mapping table, to adapt the specification of the second operation with reference to the supplementary entry.

Thus the approach taken in such embodiments is to create a "supplementary" entry in the mapping table of the register renaming circuitry which identifies a destination architectural register (where it will be understood that the architectural enumeration of the registers is that used in the program instructions) and associates this with at least one source physical register and an indication of the type of the instruction. This then enables the register renaming circuitry, when a subsequent instruction is encountered which makes use of that architectural register as a source register to reference the mapping table and to combine the operation defined for the earlier instruction, along with its defined source operands, into a combined operation incorporating the data processing to be performed in response to both the earlier and the later instructions.

As mentioned above, the decoupling of the first operation corresponding to the first instruction and the second operation corresponding to the second instruction provides the opportunity for the scheduling of the respective first and second operations to be carried out more flexibly, and in particular that their ordering with respect to one another is no longer significant. It may for example be preferable, in terms of instruction throughput, when these operations are carried out in parallel to one another, since this enables these two operations, which previously would have had to have been passed sequentially through the data processing pipeline, to be handled in parallel. Accordingly, in some embodiments the apparatus further comprises issue circuitry to issue operations specified by the register renaming circuitry to the processing circuitry for performance, wherein the issue circuitry is responsive to specification of the first operation and the second operation by the register renaming circuitry to issue the first operation and the second operation for concurrent performance by the processing circuitry.

The incorporation of the first operation corresponding to the first instruction into the second operation corresponding to the second instruction to produce the adapted second operation presents the opportunity for further incorporation of operations into one another. For example in principle the present techniques could further be used to incorporate the adapting second operation into a third operation corresponding to a third instruction to produce an adapted third operation comprising a combination of the first, second and third operations. However, this naturally adds to the complexity of the adaptation which must be carried out and furthermore requires the provision of processing circuitry capable of carrying out such a three-way combined operation. Accordingly, some embodiment steps are taken to prevent such further combination of operations and as such in these embodiments the second instruction specifies a second instruction destination architectural register, and the register renaming circuitry is responsive to a third instruction which specifies the second instruction destination architectural register as a third instruction source architectural register to avoid adaptation of a third operation corresponding to the third instruction to incorporate the second operation as adapted to incorporate the first operation corresponding to the first instruction.

Nevertheless as indicated by the discussion above the present techniques contemplate embodiments in which such further incorporation of operations is possible and accordingly in some embodiments, the second instruction specifies a second instruction destination architectural register, and the register renaming circuitry is responsive to a third instruction which specifies the second instruction destination architectural register as a third instruction source architectural register to adapt a specification of a third operation to be performed by the processing circuitry corresponding to the third instruction to use the at least one first instruction source physical register and at least one second instruction source physical register as third instruction source physical registers, wherein the third operation is adapted to incorporate the first operation corresponding to the first instruction and the second operation corresponding to the second instruction.

The present techniques recognise that there are a range of instructions to which these techniques could be applied and accordingly the first instruction and the second instruction may take various forms, however in some embodiments the first instruction and the second instruction are homogeneous. In other words they are the same type of instruction.

Furthermore in some embodiments in which the first instruction and the second instruction are homogenous, the first instruction and the second instruction specify an associative operation, and the register renaming circuitry is responsive to the second instruction to specify the second operation to be performed by the processing circuitry corresponding to the second instruction comprising an indication of a set of operands comprising a set of physical registers which are mapped to a set of architectural registers specified as source operands in the first instruction and the second instruction, wherein the set of operands omits a physical register mapped to the first instruction destination architectural register in the mapping table. The present techniques may be advantageously applied to homogeneous instructions specifying associative operations, since then the ordering of those operations specified in the instructions is not important, giving the apparatus the flexibility to implement the combined operations of the first and second instructions in a manner which facilitates their implementation.

In other embodiments the first instruction and the second instruction are heterogeneous. In other words the first instruction is of a different type to the second instruction.

In some embodiments in which the first and second instruction are heterogeneous, the register renaming circuitry is responsive to the second instruction to specify the adapted second operation to be performed by the processing circuitry comprising the first operation nested within the second operation. Such an apparatus thus has the capability to define a single operation to be carried out by the processing circuitry, wherein that single operation comprises more than one step, such as the addition of two operand values, where the sum value is then used for another purpose, such as to define a load operation.

The present techniques further recognise that the specification of an immediate value in the first instruction represents an example which may lend itself well to the rename stage fusing of instructions, for example because of the relative ease with which an immediate value can be transferred between specified operations and accordingly in some embodiments the register renaming circuitry is responsive to specification of a first immediate value in the first instruction to generate the adapted second operation comprising the first immediate value.

Furthermore it may be the case that both the first instruction and the second instruction specify an immediate value, both of which can then perform part of the adapted second operation, and accordingly in some embodiments the second instruction specifies a second immediate value, and the register renaming circuitry is responsive to the second instruction to generate the adapted second operation comprising the first immediate value and the second immediate value.

Indeed more than one immediate value may be gathered into an operation in this manner. Accordingly in some embodiments the register renaming circuitry is responsive to a third instruction which specifies the second instruction destination architectural register as a third instruction source architectural register to adapt a specification of a third operation to be performed by the processing circuitry corresponding to the third instruction comprising the first immediate value and the second immediate value.

Furthermore, in light of the above-mentioned relative ease with which immediate values may be transferred between the operations to be performed in response to instructions the above-mentioned complexities which may apply when combining more than two instructions may not be so prevalent and accordingly in some embodiments more than two immediate values may be provided as part of the adapted third operation combining the operations corresponding to a first, second and third instruction. According in some embodiments the third instruction specifies a third immediate value, and the register renaming circuitry is responsive to the third instruction to adapt the specification of the third operation to comprise the first immediate value, the second immediate value, and the third immediate value.

In accordance with one example configuration there is provided a method comprising:

performing data processing operations in processing circuitry in response to instructions;

holding data values in physical registers upon which the data processing operations are performed;

perform register renaming to map architectural registers specified in the instructions to the physical registers in support out-of-order execution of the instructions by the processing circuitry, wherein performing the register renaming comprises creating entries in a mapping table, the entries indicative of mappings between the architectural registers specified in the instructions and the physical registers;

specifying operations to be performed by the processing circuitry with respect the physical registers in dependence on the instructions and on the entries in the mapping table; and when for a first instruction an entry in the mapping table is indicative of a mapping to a first instruction destination physical register for a first instruction destination architectural register specified in the first instruction, adapting a specification of a second operation, in response to a second instruction which specifies the first instruction destination architectural register as a second instruction source architectural register, to generate an adapted second operation to be performed by the processing circuitry corresponding to the second instruction to use at least one first instruction source physical register as at least one second instruction source physical register, wherein the adapted second operation incorporates a first operation corresponding to the first instruction.

In accordance with one example configuration there is provided an apparatus comprising:

means for performing data processing operations in response to instructions;

means for holding data values in physical registers upon which the data processing operations are performed;

means for performing register renaming to map architectural registers specified in the instructions to the physical registers in support out-of-order execution of the instructions by the means for performing data processing operations, wherein performing the register renaming comprises creating entries in a mapping table, the entries indicative of mappings between the architectural registers specified in the instructions and the physical registers;

means for specifying operations to be performed by the means for performing data processing operations with respect the physical registers in dependence on the instructions and on the entries in the mapping table; and means for adapting a specification of a second operation, when for a first instruction an entry in the mapping table is indicative of a mapping to a first instruction destination physical register for a first instruction destination architectural register specified in a first instruction, the means for adapting the specification of a second operation responsive to a second instruction which specifies the first instruction destination architectural register as a second instruction source architectural register, to generate an adapted second operation to be performed by the means for performing data processing operations corresponding to the second instruction to use at least one first instruction source physical register as at least one second instruction source physical register, wherein the adapted second operation incorporates a first operation corresponding to the first instruction.

Particular embodiments will now be described with reference to the figures.

FIG. 1 illustrates a data processing apparatus 100 in accordance with some example embodiments. The apparatus comprises a pipelined structure with which one of ordinary skill in the art will generally be familiar and is only schematically illustrated at a high level in FIG. 1 for the sake of brevity. Shown in FIG. 1 is a fetch stage 102, arranged to retrieve a sequence of instructions for execution by the apparatus, where these instructions are ultimately retrieved from memory although they may be cached in a cache hierarchy of which an instruction cache 101 is shown in FIG. 1. The instructions are passed to decode stage 103 which performs decoding operations on the instructions in order to generate corresponding control signals for the remainder of the apparatus. The apparatus further comprises rename circuitry 104 which is provided to support out-of-order instruction execution by the apparatus and to map architectural registers specified in the instructions to physical registers provided within the apparatus. Generally speaking a larger number of physical registers are provided in the apparatus than those which may be specified as architectural registers, in order to provide the apparatus with the capability of holding multiple copies of certain data values in support of its out-of-order processing. Under the control of the rename control circuitry 105, the correspondence between architectural registers and physical registers is maintained in the mapping table 106 which the rename circuitry maintains. On the basis of the physical registers thus specified for each instruction the operation generation circuitry 107 of the rename circuitry 104 then generates the operations to be carried out by the processing circuitry 109. These operations are passed via an issue stage 108, which queues the operations before passing them to functional units 110-114 of the processing circuitry 109. The processing circuitry performs these data processing operations with respect to the above-mentioned physical registers which are illustrated in FIG. 1 as the set of registers 110. The data processing operations of the processing circuitry 109 also comprise access to data values in memory which may be brought into specified registers 110 in order for those data processing operations to be carried out. For this purpose a load/store unit 111 is also provided via which the apparatus 100 interacts with the memory system. Similarly to the description above of the retrieval of instructions, the retrieved data values may also be held in various levels of a data cache hierarchy between the load/store unit 111 and memory, although this is not explicitly illustrated in the figure. The present techniques are particularly concerned with the configuration of the rename circuitry 104 and the manner in which it makes use of its mapping table 106 and the operations which are consequen-tially generated by its operation generation circuitry 107. These will be described in more detail below with reference to the figures which follow.

Figure 2A:
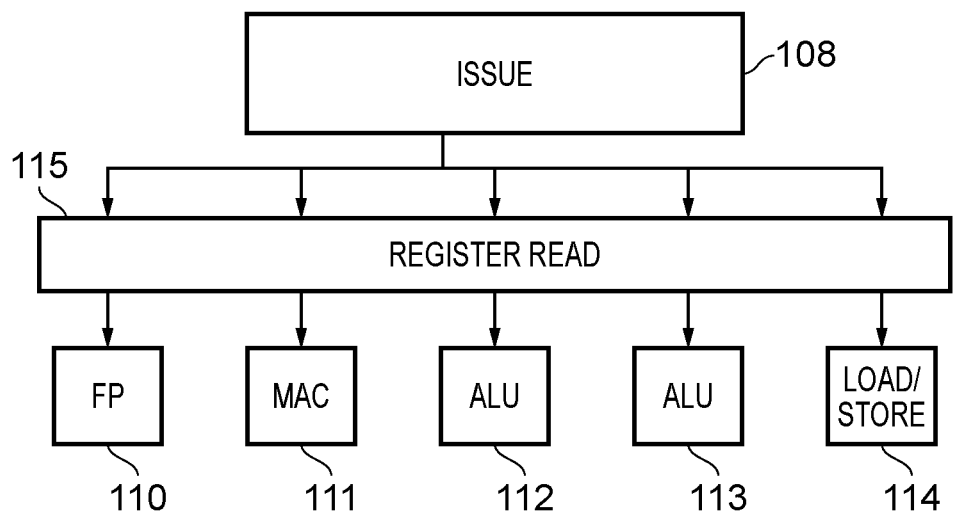
FIGS. 2A, 2B, and 2C schematically illustrate more detail of some components of the apparatus shown in FIG. 1 according to some example embodiments.
Figure 2B:
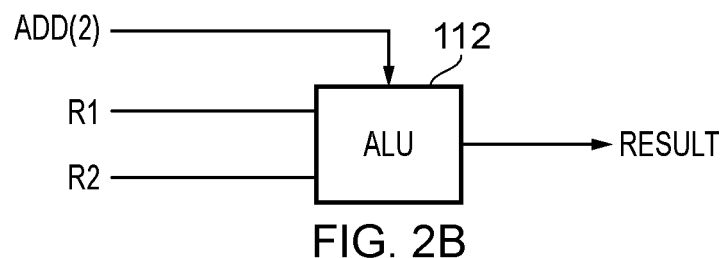
Figure 2C:
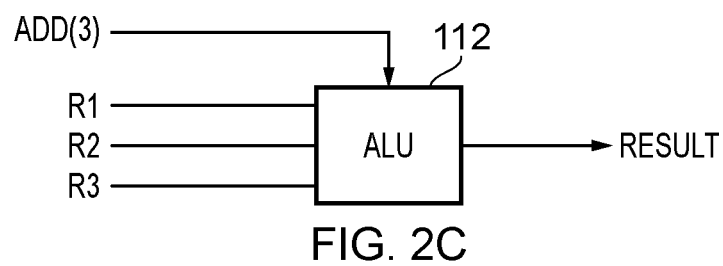

FIG. 2A schematically illustrates more detail of the issue circuitry 108 and the processing circuitry 109 in some embodiments. As shown in FIG. 2A the issue circuitry is arranged to distribute the operations generated in the register rename stage to the respective functional units 110-114 of the processing circuitry 109 for execution. As can be seen in FIG. 2A the processing circuitry 109 may comprise a variety of functional units (of which a merely exemplary selection is shown in the illustration of FIG. 2A). The set shown comprises a floating point (FP) unit 110, a multiply-accumulate (MAC) unit 111, two arithmetic logic units (ALU) 112 and 113, and a load/store unit 114. The operations issued by the issue stage 108 for execution pass via the register read stage 115, where the required register reads are performed to provide the operands for the respective operations, before they are passed to their respective functional units. In the context of the present techniques, it should be appreciated that the functional units of the processing circuitry are capable of performing a range of operations, in particular allowing at least some of them to perform operations with varying numbers of input operands. An example of this is shown in FIGS. 2B and 2C, where an ALU 112 is shown. In the example of FIG. 2B the ALU 112 is shown receiving input operands from two registers (R1 and R2) together with a control signal ADD(2) indicating that it should perform a two-operand addition of these values. By contrast in the example of FIG. 2C the ALU 112 is provided with inputs from three registers (R1, R2, and R3) and receives a control signal ADD(3) indicating that it should perform a three-operand addition.

FIGS. 3A, 3B and 3C illustrate one example of the implementation of the present techniques. FIG. 3A shows two instructions defined to be executed by the apparatus, wherein in this example both are addition (ADD) instructions. Note also that although in FIG. 3A these instructions are shown adjacent to one another, this is not a requirement of the present techniques and other instructions may be present between them. FIG. 3B shows example content of the mapping table 106 of the apparatus within the rename circuitry 104. Accordingly, entries are made in the mapping table to indicate the correspondence between architectural registers specified in the instructions and physical registers within the apparatus. Thus as can be seen in FIG. 3B entries have been created in the mapping table for the architectural registers in the example instructions of FIG. 3A. Note that in the notation used here architectural registers are indicated as x[i] and the physical registers in the apparatus are indicated by R[j], where in each case i and j respectively enumerate the set of registers. The physical registers to which the architectural registers have been mapped can therefore be determined with reference to the mapping table. Note however in particular that an additional entry for the architectural register x3 has been created in the mapping table. The creation of this "supplementary" entry has been triggered by the fact that x3 in the first instruction of FIG. 3A is a destination register, where the operation creating the data value to be stored at that location is an ADD operation, which belongs to a set of instructions which are capable of rename stage fusing within this implementation. Thus the additional entry for the architectural register x3 does not indicate the destination physical register (this being indicated by the preceding entry showing that this is mapped to physical register R10), but rather indicates the two physical registers providing the source operands for this operation.

The entry further comprises an indication of the operation to be applied to those source operands. It should be noted that in the example of FIG. 3B the operation in the mapping table is shown as "ADD" to distinguish from other types of instruction which might be subject to fusing, however in some implementations where only this type of instruction is capable of being fused then there is no need for the indication to explicitly indicate the type of operation as "ADD", but rather a simple flag could be set in association with this entry to indicate that it is this different type of entry. Equally a limited sized bit-set might be used in all examples to indicate the operation type.

Further entries in the table correspond to the source architectural register x4 and the destination architectural register x5, mapping these to the physical registers R7 and R11 respectively. The renaming circuitry, and in particular the operation generation circuitry 107 thereof, can make use of the supplementary entry for the architectural register x3 in the mapping table to modify the operation generated corresponding to the second ADD instruction of FIG. 3A. This is shown in FIG. 3C where the first instruction has resulted in the creation of the two-operand ADD operation specifying the destination of the physical register R10 and the source physical registers R8 and R9. However, the second instruction has resulted in the generation of the three-operand ADD shown in FIG. 3C, according to which the contents of physical registers R8, R9, and R7 will be added and stored in physical register R11. Importantly, the generation of this adapted second operation means that the execution of the second operation is independent of the execution of the first operation and therefore although the two instructions shown in FIG. 3A have a clear dependency, i.e. that the result of the first is required as an input of the second, this dependency is avoided by the generation of the operation shown in FIG. 3C. Nevertheless it should further be noted that the first instruction is nonetheless carried out as the first operation shown in FIG. 3C, in order to ensure that the processor state remains consistent. In this specific example this means that after the two instructions have been executed the physical register corresponding to the architectural register x3 (R10 in the example shown here) correctly contains the sum performed by the first instruction. This ensures that the data processing apparatus remains architecturally indistinguishable from an apparatus which does not employ the present techniques. Nevertheless this micro-architectural technique of the modification of the operation corresponding to the second instruction means that the two operations shown in FIG. 3C no longer have a dependency between them, and hence can be freely scheduled with respect to each other. For example, they may be executed in parallel with one another thus improving instruction throughput.

FIGS. 4A, 4B and 4C illustrate another example of the implementation of the present techniques, which may be viewed as an extension of the examples of FIGS. 3A, 3*b* and 3C. FIG. 4A extends FIG. 3A to shows three instructions defined to be executed by the apparatus, putting a third (ADD) instruction after those of the FIG. 3A example. As in the case of FIG. 3A, although these instructions are shown adjacent to one another, other instructions may be present between them. FIG. 4B shows example content of the mapping table 106 of the apparatus within the rename circuitry 104 corresponding to the state after receipt of the FIG. 4A instructions. Thus in this example the entries made in the mapping table for the FIG. 3A instructions are extended by further entries. Note in particular that an additional entry for the architectural register x5 has been created in the mapping table. Note also that in the example of FIG. 3B this entry was not created, despite the fact that the same destination architectural register x5 is also present in that example. This is because in the example of FIG. 3B, the register renaming circuitry is arranged not to generate such a supplementary entry, where one of the source registers for this instruction (ADD x5 x3 x4) already itself is the subject of a supplementary entry in the mapping table. This limits further concatenation of instruction fusion, only allowing one iteration of such fusing to occur, such that two 2-operand ADDs can be fused into a 3-operand ADD, but no further fusion is allowed.

By contrast in the example of FIG. 4B a supplementary entry for the architectural register x5 has been created in the mapping table, indicating that the source physical registers for this destination architectural register are R8, R9 (mapped from x1, x2) and R7 (mapped from x4). This is also labelled as an ADD operation. The further entries in the FIG. 4B table correspond to the source architectural register x6 and the destination architectural register x7, mapping these to the physical registers R12 and R13 respectively. The renaming circuitry, and in particular the operation generation circuitry 107 thereof, can make use of the supplementary entry for the architectural register x5 in the mapping table to modify the operation generated corresponding to the third ADD instruction of FIG. 4A. This is shown in FIG. 4C. The first instruction has resulted in the creation of the two-operand ADD operation specifying the destination of the physical register R10 and the source physical registers R8 and R9. The second instruction has resulted in the generation of the three-operand ADD using source physical registers R8, R9, and R7 and destination physical register R11. The third instruction has resulted in the generation of an adapted third operation in the form of a four-operand ADD using source physical registers R8, R9, R7, and R12, and destination physical register R13.

This means that the execution of all three operations is independent of the execution of the others (the second is not dependent on the first and the third is not dependent on the first). As in the case of the example of FIG. 3C, all three instructions are nonetheless correctly carried out, in order to ensure that the processor state remains consistent. In this specific example this means that after the three instructions have been executed the physical registers R10, R11, and R13 (corresponding to the architectural registers x3, x5, and x7) correctly contain the values that they would have had if the three instructions had been performed sequentially and dependently. The lack of dependence between the three operations shown in FIG. 4C means that they can be freely scheduled with respect to each other.

FIGS. 5A and 5B show a further example of two instructions resulting in a fused operation at the rename stage of the apparatus. As can be seen in FIG. 5A the instructions are heterogeneous, i.e. of different types, where an ADD instruction is followed by a load (LDR) instruction. Further, the LDR instruction comprises an immediate source operand ("#1") where the LDR specifies that a data value at a memory address given by the content of register x3 incremented by the immediate value #1 is to be loaded into register x4. As a result of the rename stage processing, the operations shown in FIG. 5B are generated, where the first instruction results in an ADD operation, summing the content of physical registers R8 and R9 and storing the content in physical register R10. The second instruction results in the adapted load operation of FIG. 5B, where the addition operation is nested within the load. The adapted operation specifies the source operands of physical registers R8 and R9 and the immediate value #1. Accordingly the adapted load operation sums R8 and R9, incrementing this value by #1, giving the address from which the load should be carried out with the loaded data value being placed in the physical register R7.

FIGS. 6 and 7 show how renaming and execution may be carried out and scheduled, whereby FIG. 6 shows an example of how this might be carried out in the absence of the present techniques and FIG. 7 shows an example in accordance with some example embodiments of the present techniques. The example in each case is based on the implementation of a memcopy (x8, x9, 64 bytes) procedure, which is implemented by a set of LDP (load pair) instructions and a set of STP (store pair) operations. In this procedure x8 contains the source address, which is post-indexed by #16 via each LDP instruction. x9 contains the data store address, also post-indexed by #16. Hence this procedure may be implemented as:

memcopy:
ldp1 x0, x1, [x8], #16
ldp1 x2, x3, [x8], #16
ldp1 x4, x5, [x8], #16
ldp1 x6, x7, [x8], #16
stp1 x0, x1, [x9], #16
stp1 x2, x3, [x9], #16
stp1 x4, x5, [x9], #16
stp1 x6, x7, [x9], #16

The examples of FIGS. 6 and 7 assume a 4-wide renaming stage (i.e. which can process 4 instructions in parallel). It is also assumed that LDP1 gets cracked into an LDP followed by an ADD as the micro-ops (mops) which are actually handled. On this basis FIGS. 6 and 7 show how progression through the respective pipelines without (FIG. 6) and with (FIG. 7) the present techniques). Note that the 3rd LDP mop with uid=0x14 has no dependency on the second LDP1 sequence in the proposed case shown in FIG. 7.

FIG. 8 schematically illustrates rename stage circuitry 200 in accordance with some example embodiments. As in the example of FIGS. 6 and 7, the rename stage circuitry 200 is configured to have four lanes, such that four instructions can be processed in parallel. The illustrated example of FIG. 8 shows the lanes (0-3) processing the instructions: LDP, ADD, LDP, ADD (the same sequence of instructions as shown in the example of FIGS. 6 and 7). A first dependency identification stage 202 compares the specified source and destination registers of the four instructions being processed and in particular identifies instances where the destination architectural register of an earlier instruction is also the source architectural register of a later instruction. Note that FIG. 8 labels the decreasing instruction age downwards on the page, i.e. that lane 0 carries the oldest of the four instructions and lane 3 carries the youngest. The illustrated example of FIG. 8 shows that such a dependency has been identified between the two ADD instructions and in particular that the destination architectural register of the earlier ADD instruction is also the source architectural register of the later ADD instruction. Triggered by this identification the physical register (SRC PTAG 203) mapped to the source architectural register of the earlier ADD instruction and the immediate value (IMM 204) of this instruction are forwarded from lane 1 to lane 3. In lane 3 these are labelled SRC PTAG 207 and IMM2 208. In lane 3, handling the second ADD instruction, the physical register (SRC PTAG 205) mapped to the source architectural register of the second ADD instruction is cancelled, although the immediate value (IMM 206) of this instruction is maintained. Hence in the operation generation stage 210 of the rename stage circuitry 200 the operation generated in lane 1 corresponding to the first ADD instruction is unmodified. However the operation generated in lane 3 combines the forwarded operands from lane 1 SRC PTAG 207 and IMM2 208 with the immediate value IMM 206.

The lane 3 generated operation 216 is thus:
operation: {ADD}
source operands: {SRC PTAG 207; IMM 206; IMM2 208}
destination register: {DST0 PTAG}
where this defines a 3-way add operation, summing the content of the physical register SRC PTAG 207 and the two immediate values IMM 206 and IMM2 208.

The lane 0 generated operation 213 is:
operation: {LDP}
source operand: {SRC PTAG}
destination registers: {DST0 PTAG; DST1 PTAG}

The lane 1 generated operation 214 is:
operation: {ADD}
source operands: {SRC PTAG 203; IMM 204}
destination register: {DST0 PTAG}

The lane 2 generated operation 215 is:
operation: {LDP}
source operand: {SRC PTAG}
destination registers: {DST0 PTAG; DST1 PTAG}

These generated operations are then passed to the issue stage 218, which issues operations to execution circuitry. Note that ADD operations 214 and 216 may be issued in the same cycle, since the dependency between the instructions to which they correspond has been removed.

Figure 9:
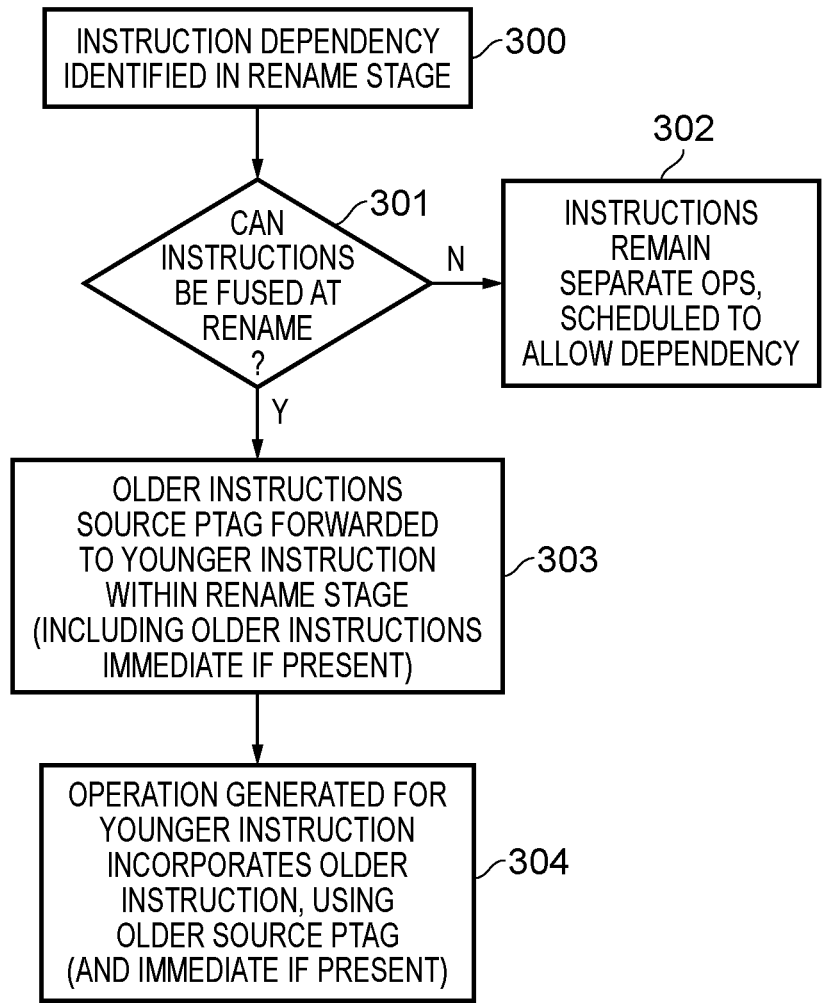
FIG. 9 shows a sequence of steps taken according to the method of some embodiments when determining at a rename stage whether operations corresponding to two instructions can be fused.

FIG. 9 shows a sequence of steps taken according to the method of some embodiments when determining at a rename stage whether operations corresponding to two instructions can be fused. The illustrated flow begins at step 300, where an instruction dependency of the type discussed above is identified at the rename stage. It is then determined at step 301 whether these instructions are of the type which can be fused at the rename stage. When this is not the case, the flow proceeds to step 302 and concludes there, with the operations generated with respect to each instruction remaining as separate operations, which are scheduled for execution sequentially to allow for the identified dependency. Conversely if it is determined at step 301 that the instructions are of a type which can be fused then the flow proceeds to step 303. Here an identifier of the source physical register (the "source ptag") for the older instruction is forwarded to the younger, dependent instruction. If the older instruction also specifies one or more immediate values, this or these are also forwarded to the younger instruction. Then, at step 304, the operation to be carried out with respect to the younger instruction is generated and also incorporates the operation specified by the older instruction, using the identifier received from the older instruction (and any immediate values if present).

Figure 10:
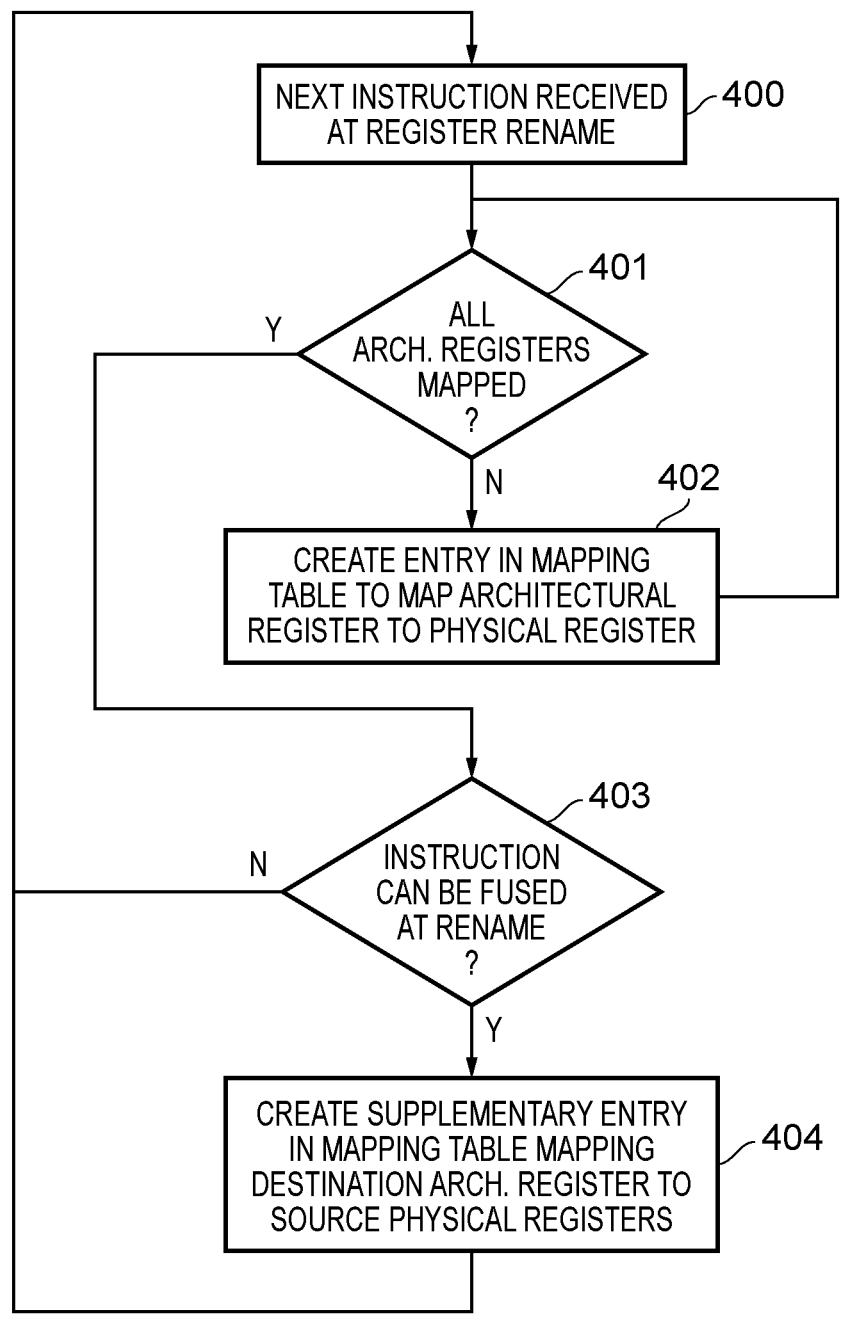
FIG. 10 shows a sequence of steps which are taken according to the method of some embodiments when creating entries in a rename mapping table.

FIG. 10 shows a sequence of steps which are taken according to the method of some embodiments when instructions are processed at a register rename stage. The flow can be considered to begin at step 400, where the next instruction is received at the register rename stage. Next it is determined at step 401 whether all architectural registers specified in the instruction already have a mapping to physical registers specified in the register rename mapping table. If this is not the case then at step 402 an entry is created in the mapping table to map an architectural register specified in the instruction to an available physical register. The flow then returns to step 401 and this process continues until all specified architectural registers have been mapped.

When this is the case from step 401 the flow proceeds to step 403, where it is determined whether this instruction is of a type which can potentially be fused at the register rename stage. When this is not the case the flow returns to step 400 for the next instruction to be processed. However when it is determined at step 403 that such register rename stage fusing is possible for this type of instruction then the flow proceeds to step 404. Here a supplementary entry is made in the mapping table which indicates a destination architectural register of the instruction in association with its source physical registers. If instruction fusing has been implemented for more than one type of instruction then an indication of the instruction type is also stored in association with this supplementary entry. The flow then returns to step 400.

Figure 11:
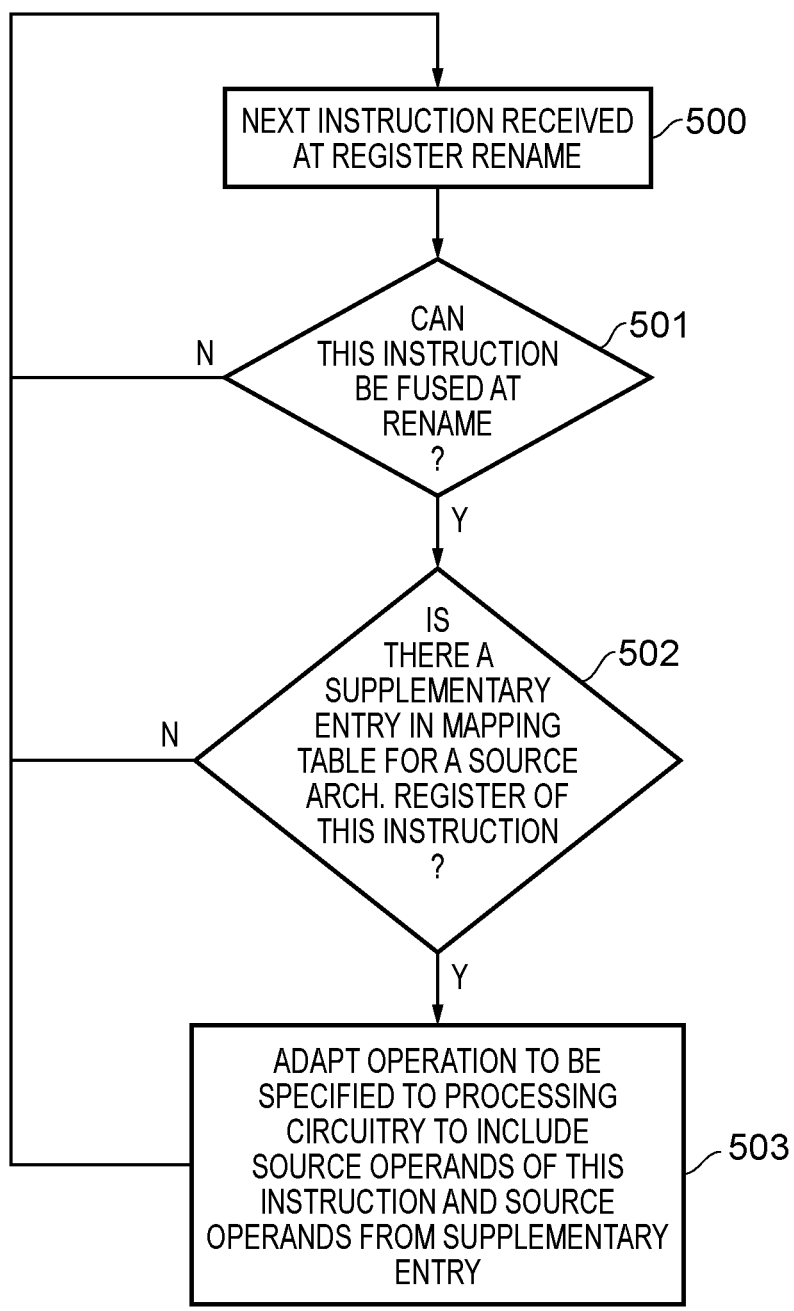
FIG. 11 shows a sequence of steps taken according to the method of some embodiments when determining at a rename stage whether operations corresponding to two instructions can be fused.

FIG. 11 shows a sequence of steps taken according to the method of some embodiments when determining at a rename stage whether operations corresponding to two instructions can be fused. The flow can be considered to begin at step 500 where the next instruction is received at the register rename stage. It is then determined at step 501 whether this is an instruction of a type which potentially can be fused at the register rename stage. When this is not the case the flow returns to step 500 for the next instruction to be processed. When such fusing is potentially possible, flow proceeds to step 502 where the register rename mapping table is examined and it is determined whether there is a supplementary entry in the mapping table corresponding to a source architectural register of this instruction. When this is not the case the flow returns to step 500 and no fusion of this instruction occurs. However when such a supplementary entry is identified at step 502, the flow proceeds to step 503 and the operation generated corresponding to this instruction is adapted to include the source physical register operands from the identified supplementary entry as well as a source physical register operand(s) from this instruction itself. Immediate values may also be included. An adapted operation is thus generated corresponding to a combination of the earlier instruction which caused the generation of the supplementary entry in the mapping table and the current instruction being processed. This adapted operation is thus generated having no dependency on an operation generated corresponding to the earlier instruction. The flow then returns to step 500.

In brief overall summary, in register renaming circuitry architectural registers specified in instructions are mapped to physical registers using a mapping table. Operations to be performed with respect to the physical registers are generated in dependence on the instructions and on the mapping table entries. When the mapping table has a mapping of a first instruction destination physical register for a first instruction destination architectural register specified in a first instruction, a second instruction specifying the first instruction destination architectural register as a second instruction source architectural register causes an adapted second operation to be generated corresponding to the second instruction using at least one first instruction source physical register as at least one second instruction source physical register, and wherein the adapted second operation incorporates a first operation corresponding to the first instruction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:
1. Apparatus comprising:
processing circuitry to perform data processing operations in response to instructions;
physical registers to hold data values upon which the data processing operations are performed; and
register renaming circuitry to perform register renaming to map architectural registers specified in the instructions to the physical registers in support of out-of-order execution of the instructions by the processing circuitry, wherein performing the register renaming comprises creating entries in a mapping table, the entries indicative of mappings between the architectural registers specified in the instructions and the physical registers, wherein:
the register renaming circuitry is arranged to specify operations to be performed by the processing circuitry with respect to the physical registers in dependence on the instructions and on the entries in the mapping table,
when for a first instruction an entry in the mapping table is indicative of a mapping to a first instruction destination physical register for a first instruction destination architectural register specified in the first instruction,
the register renaming circuitry is responsive to a second instruction which specifies the first instruction destination architectural register as a second instruction source architectural register to adapt a specification of a second operation to generate an adapted second operation to be performed by the processing circuitry corresponding to the second instruction to use at least one first instruction source physical register as at least one second instruction source physical register, and wherein the adapted second operation incorporates a first operation corresponding to the first instruction,
the register renaming circuitry is further responsive to the first instruction to create a supplementary entry in the mapping table,
the supplementary entry is indicative of a mapping of the first instruction destination architectural register to the at least one first instruction source physical register and is indicative of a type of the first instruction,
the at least one first instruction source physical register is mapped in the mapping table to at least one first instruction source architectural register specified in the first instruction,
the register renaming circuitry is further responsive to the second instruction which specifies the first instruction destination architectural register as the second instruction source architectural register, when the supplemen- tary entry is present in the mapping table, to adapt the specification of the second operation with reference to the supplementary entry, the second instruction specifies a second instruction destination architectural register, and in response to a third instruction specifying a fusible operation and specifying the second instruction destination architectural register as a third instruction source architectural register, the register renaming circuitry is configured to avoid adaptation of a third operation corresponding to the third instruction to incorporate the second operation as adapted to incorporate the first operation corresponding to the first instruction.

2. The apparatus as claimed in claim 1, further comprising issue circuitry to issue operations specified by the register renaming circuitry to the processing circuitry for performance, wherein the issue circuitry is responsive to specification of the first operation and the second operation by the register renaming circuitry to issue the first operation and the second operation for concurrent performance by the processing circuitry.

3. The apparatus as claimed in claim 1, wherein the first instruction and the second instruction are homogeneous.

4. The apparatus as claimed in claim 3, wherein the first instruction and the second instruction specify an associative operation, and the register renaming circuitry is responsive to the second instruction to specify the second operation to be performed by the processing circuitry corresponding to the second instruction comprising an indication of a set of operands comprising a set of physical registers which are mapped to a set of architectural registers specified as source operands in the first instruction and the second instruction, wherein the set of operands omits a physical register mapped to the first instruction destination architectural register in the mapping table.

5. The apparatus as claimed in claim 1, wherein the first instruction and the second instruction are heterogeneous.

6. The apparatus as claimed in claim 5, wherein the register renaming circuitry is responsive to the second instruction to specify the adapted second operation to be performed by the processing circuitry comprising the first operation nested within the second operation.

7. The apparatus as claimed in claim 1, wherein the register renaming circuitry is responsive to specification of a first immediate value in the first instruction to generate the adapted second operation comprising the first immediate value.

8. The apparatus as claimed in claim 7, wherein the second instruction specifies a second immediate value, and the register renaming circuitry is responsive to the second instruction to generate the adapted second operation comprising the first immediate value and the second immediate value.

9. A method comprising:

performing data processing operations in processing circuitry in response to instructions;

holding data values in physical registers upon which the data processing operations are performed;

performing register renaming to map architectural registers specified in the instructions to the physical registers in support of out-of-order execution of the instructions by the processing circuitry, wherein performing the register renaming comprises creating entries in a mapping table, the entries indicative of mappings between the architectural registers specified in the instructions and the physical registers;

specifying operations to be performed by the processing circuitry with respect to the physical registers in dependence on the instructions and on the entries in the mapping table;

when for a first instruction an entry in the mapping table is indicative of a mapping to a first instruction destination physical register for a first instruction destination architectural register specified in the first instruction, adapting a specification of a second operation, in response to a second instruction which specifies the first instruction destination architectural register as a second instruction source architectural register, to generate an adapted second operation to be performed by the processing circuitry corresponding to the second instruction to use at least one first instruction source physical register as at least one second instruction source physical register, wherein the adapted second operation incorporates a first operation corresponding to the first instruction, creating a supplementary entry in the mapping table, in response to the first instruction, wherein the supplementary entry is indicative of a mapping of the first instruction destination architectural register to the at least one first instruction source physical register and is indicative of a type of the first instruction, wherein the at least one first instruction source physical register is mapped in the mapping table to at least one first instruction source architectural register specified in the first instruction, and adapting the specification of the second operation with reference to the supplementary entry, in response to the second instruction which specifies the first instruction destination architectural register as the second instruction source architectural register, when the supplementary entry is present in the mapping table, wherein the second instruction specifies a second instruction destination architectural register, and in response to a third instruction specifying a fusible operation and specifying the second instruction destination architectural register as a third instruction source architectural register, avoiding adaptation of a third operation corresponding to the third instruction to incorporate the second operation as adapted to incorporate the first operation corresponding to the first instruction.

10. Apparatus comprising:

processing means for performing data processing operations in response to instructions;

physical register means for holding data values upon which the data processing operations are performed; and register renaming means for performing register renaming to map architectural registers specified in the instructions to the physical register means in support of out-of-order execution of the instructions by the processing means, wherein performing the register renaming comprises creating entries in a mapping table, the entries indicative of mappings between the architectural registers specified in the instructions and the physical register means, wherein the register renaming means is further for specifying operations to be performed by the processing means with respect to the physical register means in dependence on the instructions and on the entries in the mapping table, wherein the register renaming means is further for adapting a specification of a second operation, when for a first instruction an entry in the mapping table is indicative of a mapping to a first instruction destination physical register means for a first instruction destination architectural register specified in a first instruction, the register renaming means for adapting the specification of a second operation responsive to a second instruction which specifies the first instruction destination architectural register as a second instruction source architectural register, to generate an adapted second operation to be performed by the processing means corresponding to the second instruction to use at least one first instruction source physical register means as at least one second instruction source physical register means, wherein the adapted second operation incorporates a first operation corresponding to the first instruction, the register renaming means responsive to the first instruction to create a supplementary entry in the mapping table, wherein the supplementary entry is indicative of a mapping of the first instruction destination architectural register to the at least one first instruction source physical register means and is indicative of a type of the first instruction, wherein the at least one first instruction source physical register means is mapped in the mapping table to at least one first instruction source architectural register specified in the first instruction, and the register renaming means further responsive to the second instruction which specifies the first instruction destination architectural register as the second instruction source architectural register, when the supplementary entry is present in the mapping table, to adapt the specification of the second operation with reference to the supplementary entry, wherein the second instruction specifies a second instruction destination architectural register, and in response to a third instruction specifying a fusible operation and specifying the second instruction destination architectural register as a third instruction source architectural register, the register renaming means is configured to avoid adaptation of a third operation corresponding to the third instruction to incorporate the second operation as adapted to incorporate the first operation corresponding to the first instruction.

* * * * *